(12) United States Patent
Yau et al.

(10) Patent No.: US 10,558,826 B2
(45) Date of Patent: Feb. 11, 2020

(54) METHOD AND APPARATUS FOR PROVIDING SECURITY MODE TO USER DEVICE

(71) Applicant: Samsung Electronics Co., Ltd., Suwon-si, Gyeonggi-do (KR)

(72) Inventors: Arnold Yau, Staines (GB); Parashuram Chawan, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 15/554,266

(22) PCT Filed: Mar. 4, 2016

(86) PCT No.: PCT/KR2016/002206
§ 371 (c)(1),
(2) Date: Aug. 29, 2017

(87) PCT Pub. No.: WO2016/140548
PCT Pub. Date: Sep. 9, 2016

(65) Prior Publication Data
US 2018/0082085 A1   Mar. 22, 2018

(30) Foreign Application Priority Data

Mar. 5, 2015 (GB) .................................. 1503736.9
Jan. 25, 2016 (KR) ........................ 10-2016-0008877

(51) Int. Cl.
*G06F 21/00* (2013.01)
*G06F 21/74* (2013.01)
*G06F 21/83* (2013.01)
*G06F 21/57* (2013.01)
*G06F 21/84* (2013.01)
(Continued)

(52) U.S. Cl.
CPC ............ *G06F 21/74* (2013.01); *G06F 21/577* (2013.01); *G06F 21/83* (2013.01); *G06F 21/84* (2013.01); *G06F 21/53* (2013.01); *G06F 21/629* (2013.01); *G06F 2221/031* (2013.01); *G06F 2221/2107* (2013.01); *G06F 2221/2111* (2013.01)

(58) Field of Classification Search
CPC ........ G06F 21/74; G06F 21/577; G06F 21/83; G06F 21/84; G06F 21/53; G06F 21/629; G06F 2221/031; G06F 2221/2107; G06F 2221/2111
See application file for complete search history.

(56) References Cited

U.S. PATENT DOCUMENTS 6,918,039 B1 * 7/2005 Hind .................... G06F 21/6218
713/176
2007/0198843 A1 * 8/2007 Cradick ................ G06F 1/1613
713/182
(Continued)

*Primary Examiner* — Ghodrat Jamshidi
(74) *Attorney, Agent, or Firm* — Jefferson IP Law, LLP

(57) ABSTRACT

Provided are a method and an apparatus for providing a secure mode for a device. The method includes obtaining a plurality of parameters for determining a security environment of the device from one or more devices included in the device; determining whether the device is in an insecure environment based on combinations of the obtained plurality of parameters; and, when it is determined that the device is in an insecure environment, controlling the device to operate in the secure mode.

23 Claims, 6 Drawing Sheets

(51) Int. Cl.
*G06F 21/53* (2013.01)
*G06F 21/62* (2013.01)

(56) References Cited

U.S. PATENT DOCUMENTS

| | | | | |
|---|---|---|---|---|
| 2010/0095373 | A1* | 4/2010 | Levenshteyn | G06F 21/62 |
| | | | | 726/21 |
| 2011/0208974 | A1* | 8/2011 | Goldman | G06F 21/83 |
| | | | | 713/189 |
| 2011/0265156 | A1* | 10/2011 | Bombay | G06F 21/34 |
| | | | | 726/5 |
| 2013/0103943 | A1* | 4/2013 | Hirsch | G09C 5/00 |
| | | | | 713/168 |
| 2013/0268777 | A1* | 10/2013 | Grobman | G06F 21/83 |
| | | | | 713/189 |
| 2013/0298246 | A1* | 11/2013 | Cragun | G06F 21/36 |
| | | | | 726/26 |
| 2015/0104013 | A1* | 4/2015 | Holman | G06F 21/602 |
| | | | | 380/243 |
| 2015/0112796 | A1* | 4/2015 | Greenzeiger | G06Q 30/0251 |
| | | | | 705/14.49 |
| 2015/0163240 | A1* | 6/2015 | Geigel | G06F 11/3006 |
| | | | | 726/23 |
| 2015/0358790 | A1* | 12/2015 | Nasserbakht | H04W 4/16 |
| | | | | 455/414.1 |

\* cited by examiner

METHOD AND APPARATUS FOR PROVIDING SECURITY MODE TO USER DEVICE

TECHNICAL FIELD

The present invention is intended to provide a secure mode to a user device. More particularly, a method and an apparatus according to an embodiment of the present invention provide a secure mode for protecting sensitive user information from being accessed by a third party.

BACKGROUND ART

Modern user devices, such as smart phones, mobile devices, tablet computers, and wearable devices, which may utilize a variety of applications, may involve the use of sensitive user information. For example, a mobile banking application executed on a smart phone may make a user to use personal financial information. Alternatively, in the case of accessing a web site via a user device, such as a smart phone, it may be necessary to enter security information, such as a username and a password. However, such sensitive user data may be viewed by a third party sharing a similar field of view as that of the user using the user device. For example, in an environment like on crowded public transportation, when sensitive data of a user is displayed on a device, other people nearby may see it. Furthermore, when a malicious key login program (malware) is installed on the user device, the malicious key login program may send the sensitive data of the user to a third party.

DETAILED DESCRIPTION OF THE INVENTION

Technical Problem

The present invention provides a method of protecting sensitive user information from a third party.

Technical Solution

Provided are a method and an apparatus for providing a secure mode for a device. The method may include obtaining a plurality of parameters for determining a security environment of the device from one or more devices included in the device; determining whether the device is in an insecure environment based on combinations of the obtained plurality of parameters; and, when it is determined that the device is in an insecure environment, controlling the device to operate in the secure mode.

Advantageous Effects of the Invention

A method and an apparatus according to an embodiment of the present invention provide a secure mode for protecting sensitive user information from a third party.

BEST MODE

Figure 1:
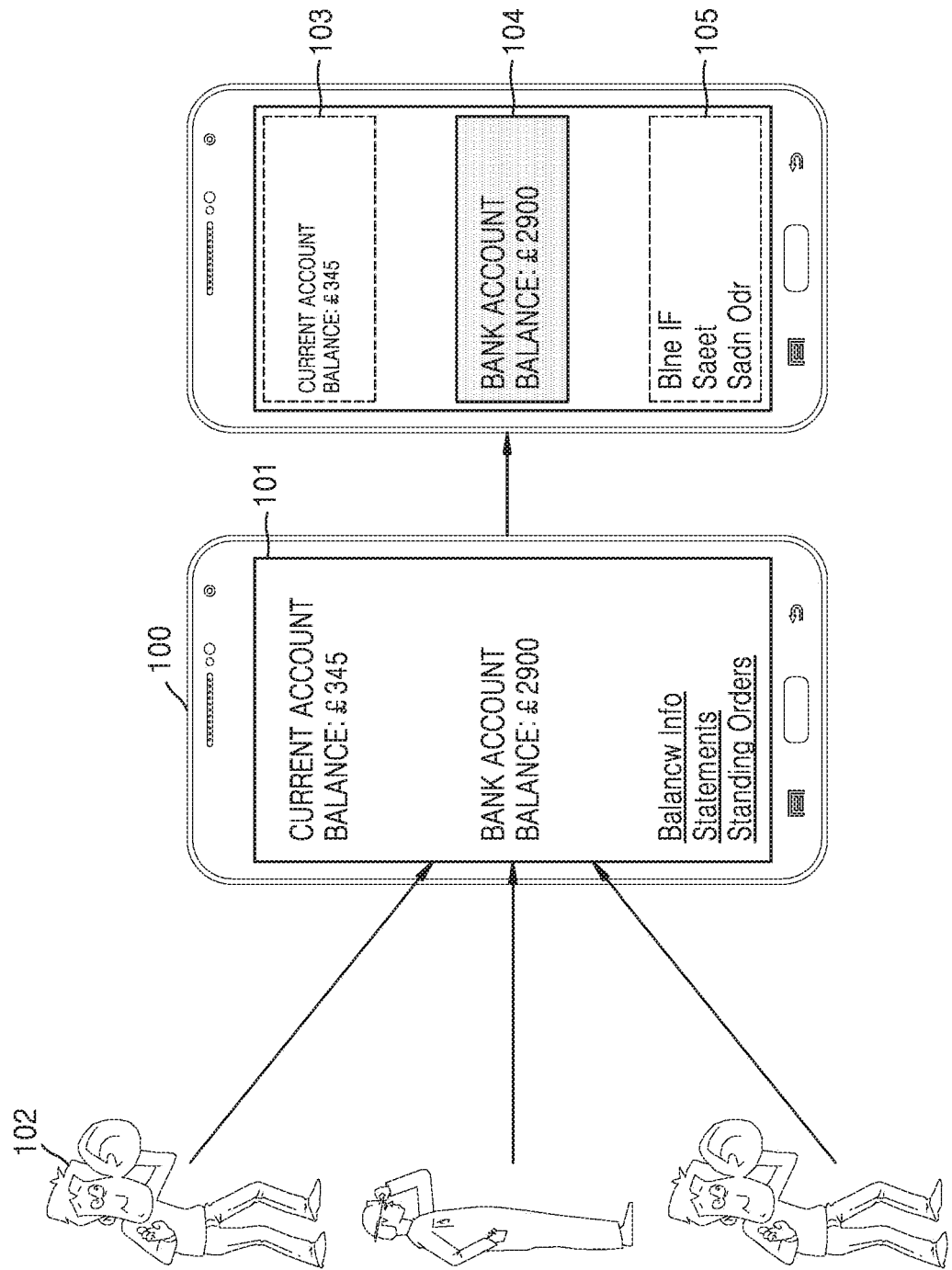
FIG. 1 is a diagram showing an example in which a user device according to an embodiment provides a secure mode.

According to an aspect of the invention, there is provided a method of providing a secure mode of a device, the method including obtaining a plurality of parameters for determining a security environment of the device from one or more devices included in the device; determining whether the device is in an insecure environment based on combinations of the obtained plurality of parameters; and, when it is determined that the device is in an insecure environment, controlling the device to operate in the secure mode.

The determining of whether the device is in an insecure environment may further include generating a security score indicating a level of security by combining the plurality of parameters; and determining that the device is in an insecure environment when the security score exceeds a threshold value.

In the obtaining of the plurality of parameters, one or more parameters representing an insecure environment may be obtained by analyzing an audio signal captured by a microphone of the device.

The one or more parameters may include a noise level.

The determining of whether the device is in the insecure environment may include, when the device is determined to be in a public place, determining that the device is in the insecure environment.

The secure mode may include a secure input mode, and, in the secure input mode, a user input may be transmitted to an application after a decoding algorithm is applied to the user input.

The secure mode may include a secure output mode, and, in the secure output mode, regions other than a region viewed by a user are made invisible.

The method may further include generating a notification to notify only a user that the device is operating in the secure mode.

According to another aspect of the invention, there is provided a device that provides a secure mode, the device including a security manager that obtains a plurality of parameters for determining a security environment of the device from one or more devices included in the device and determines whether the device is in an insecure environment based on combinations of the obtained plurality of parameters; and a control unit that controls the device to operate in the secure mode when it is determined that the device is in an insecure environment.

The security manager may generate a security score indicating a level of security by combining the plurality of parameters, and it may be determined that the device is in an insecure environment when the security score exceeds a threshold value.

The device may further include a microphone, wherein the security manager obtains one or more parameters representing an insecure environment by analyzing an audio signal captured by the microphone.

The one or more parameters may include a noise level.

When the device is determined to be in a public place, the security manager may determine that the device is in an insecure environment.

The secure mode may include a secure input mode, and the device may further include an input unit which, in the secure input mode, transmits a user input to an application after a decoding algorithm is applied to the user input.

The secure mode may include a secure output mode, and, when the secure output mode is provided, the control unit may control a display unit to make regions other than a region viewed by a user invisible from among content to be provided on the display unit.

The device may further include a vibration generating unit that generates a notification to notify only a user that the device is operating in a secure mode.

According to another aspect of the invention, there is provided a non-transitory computer-readable recording medium having recorded thereon a program for executing the method according to an aspect on a computer.

MODE OF THE INVENTION

The advantages and features of the present invention, and how to accomplish them, will become apparent with reference to the embodiments described below with reference to the accompanying drawings. The present invention may, however, be embodied in many different forms and should not be construed as limited to the embodiments set forth herein. Rather, these embodiments are provided so that this disclosure will be thorough and complete, and will fully convey the scope of the invention to those of ordinary skill in the art and the invention is only defined by the scope of the claims.

The terms used in this specification will be briefly described, and the present disclosure will be described in detail.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

Unless explicitly described to the contrary, the word "comprise" and variations such as "comprises" or "comprising" will be understood to imply the inclusion of stated elements but not the exclusion of any other elements. In addition, the term "units" described in the specification means units for processing at least one function and operation and can be implemented by software components or hardware components, such as FPGA or ASIC. However, the "units" are not limited to software components or hardware components. The "units" may be embodied on a recording medium and may be configured to operate one or more processors. Therefore, for example, the "units" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" may be combined to smaller numbers of components and "units" or may be further divided into larger numbers of components and "units."

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, an electronic device according to the present invention will be described in details with reference to the attached drawings. The suffixes 'module' and 'unit' may be used for elements in order to facilitate the disclosure. Significant meanings or roles may not be given to the suffixes themselves and it is understood that the 'module' and 'unit' may be used together or interchangeably.

"One embodiment" or "an embodiment" of the principles of the present invention as used herein is intended to include all of the specific features, structures, features, and the like described in connection with the embodiments included in at least one embodiment of the principles of the invention. Therefore, appearances of the phrases 'in some embodiments,' 'in certain embodiments,' in various embodiments,' and similar language throughout this specification may, but do not necessarily, all refer to the same embodiment, but may mean 'one or more but not all embodiments' unless expressly specified otherwise.

In the present specification, the term "interception" according to an embodiment may refer to an operation for obtaining information regarding another person secretly. For example, the interception may include at least one of spying, peeking, and eavesdropping.

Hereinafter, a method of providing a secure mode by a user device according to an embodiment will be described with reference to the attached drawings.

FIG. 1 is a diagram showing an example in which a device 100 according to an embodiment provides a secure mode.

Referring to FIG. 1, when a user of the device 100 is in a densely populated environment, such as on crowded public transportation, a stranger 102 nearby may see a screen 101 of the device 100. At this time, when personal information (a phone number, a home address, etc.) of the user or information (e.g., a password, account information, etc) requiring security is displayed on the screen 101, the stranger 102 may easily recognize such information. Therefore, the device 100 according to an embodiment may provide a secure mode to the user in a situation where sensitive information regarding the user may be leaked to a stranger (hereinafter referred to as an insecure environment), thereby protecting sensitive information input/output to/from the device 100 by/to the user.

For example, when it is determined that a user device is in an insecure environment, the size of content displayed on the user device may be reduced (103). Alternatively, sensitive information displayed on the user device may be blurred or shaded (104), thereby making it difficult for a stranger to identify the sensitive information. Alternatively, in a situation where sensitive information needs to be input to the user device, a secure input mode may be set (105), and thus characters may be input in a manner pre-set by a user with respect to a device.

Hereinafter, a method of providing, by a device, a secure mode will be described in detail with reference to FIG. 2.

Figure 2:
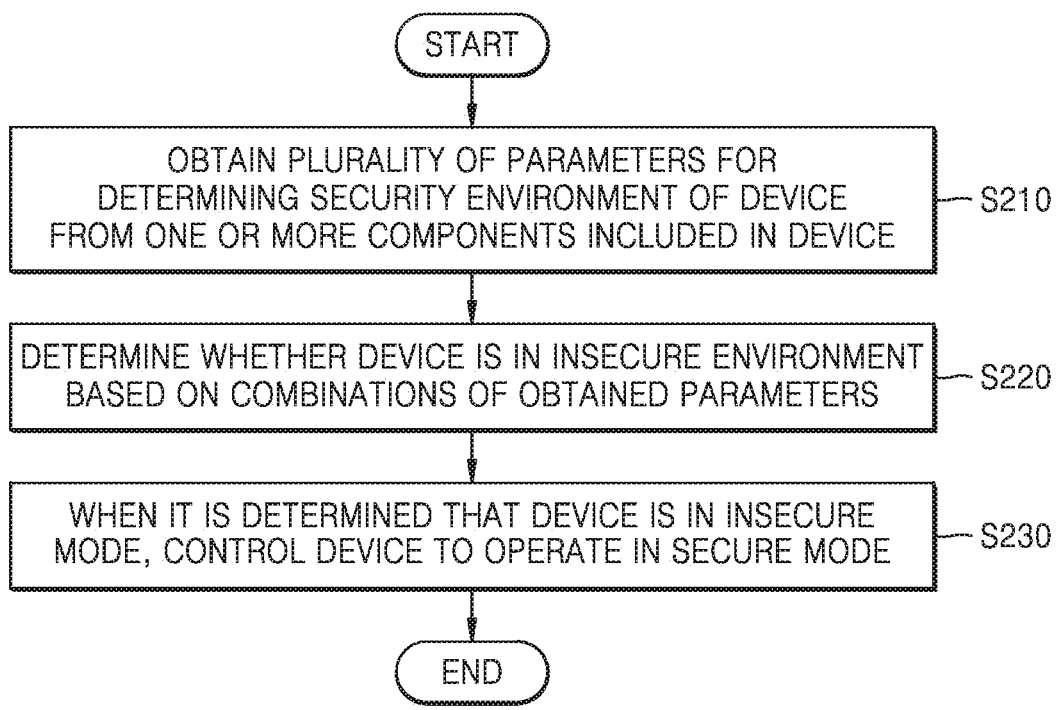
FIG. 2 is a flowchart showing a method of providing, by a user device, a secure mode, according to an embodiment.

FIG. 2 is a flowchart showing a method of providing, by a device, a secure mode, according to an embodiment.

In operation S210, the device 100 may obtain a plurality of parameters for determining an environment surrounding the device 100 from one or more components included in the device 100.

The components included in the device 100 may include components capable of generating and/or receiving information for determining whether the device 100 is in an environment where sensitive information may be observed by a stranger, e.g., a microphone, a global positioning system (GPS), a WiFi module, a camera, etc. For example, when a plurality of user voices are input via the microphone, it may be determined that the device 100 is in an insecure environment.

An insecure environment according to an embodiment may refer to an environment in which the device 100 is likely to be observed by a third party or an environment in which content displayed on the device 100 is being actually viewed by a third party other than a user of the device 100, e.g., a public place, public transportation, etc. Meanwhile, it may be determined whether a plurality of user voices are input based on the level of noise input via the microphone. Furthermore, various other methods as described below may be used.

Next, in operation S220, the device 100 may determine whether the device 100 is in an insecure environment based on a combination of the plurality of parameters obtained in operation S210. For example, the device 100 may generate a security score by weighting at least one of at least one parameter obtained from the components. Therefore, the device 100 may compare the security score with a predetermined threshold value, thereby determining whether the device 100 is in an insecure environment.

In operation S230, when it is determined that the device 100 is in an insecure environment, the device 100 may be controlled to operate in a secure mode. The secure mode may include a secure input mode and/or a secure output mode.

For example, in the secure input mode, the user may prevent input contents from being exposed to a third party by inputting characters encoded in a pre-set manner. In particular, since it is necessary for the device 100 to guide a user to perform an encoded input without using a complicated security system, this method is highly versatile. Furthermore, since a user input is encoded, security may be maintained even when malicious software is installed on the device 100. The secure input mode will be described below in detail with reference to FIG. 6.

In another example, the secure output mode may make regions other than a region viewed by a user invisible.

Figure 3:
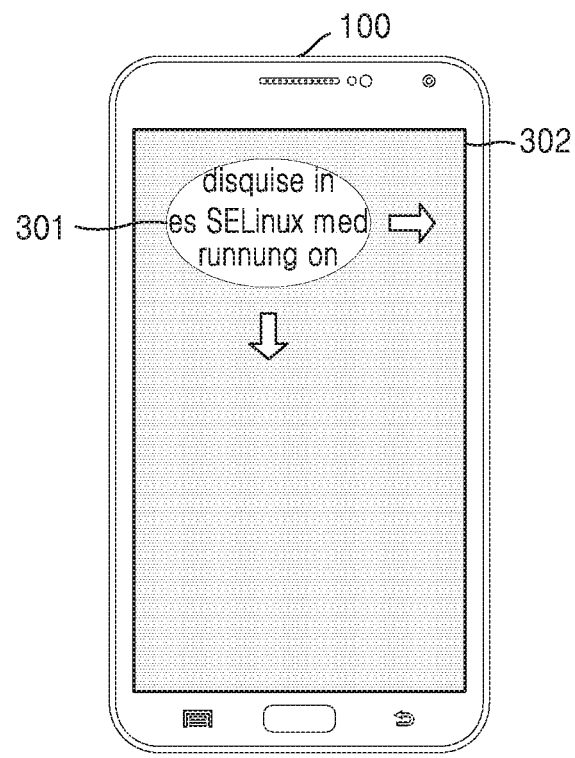
FIG. 3 is a diagram showing an example in which the user device according to an embodiment provides a secure output mode.

FIG. 3 is a diagram showing an example in which the device 100 according to an embodiment provides a secure output mode. Referring to FIG. 3, the device 100 may display only a region 301 viewed by a user and may make the other regions 302 invisible (e.g., blurred or shaded). Meanwhile, the device 100 may determine a region 301 viewed by a user by tracking the user's eyes by using a camera. Alternatively, a region 301 from a point touched by a user may be displayed as a region viewed by the user.

Furthermore, sensitive information of a user may be protected by using various methods described below, such that it is difficult for a third party to observe the sensitive information.

Figure 4:
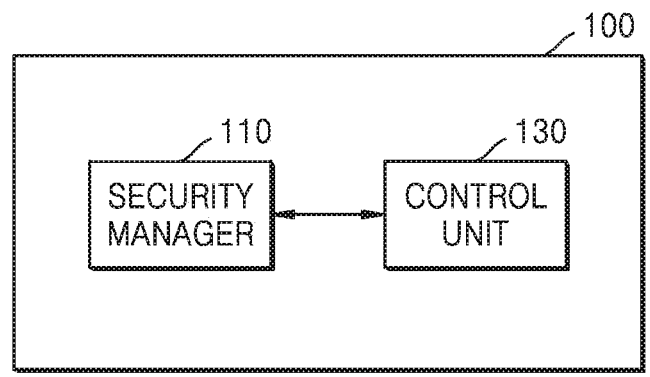
FIG. 4 is a block diagram of the device providing a secure mode, according to an embodiment.

FIG. 4 is a block diagram of the device 100 providing a secure mode according to an embodiment.

FIG. 4 shows only the components of the device 100 for providing a secure mode, according to the present embodiment. Therefore, one of ordinary skill in the art will understand that general-purpose components other than the components shown in FIG. 4 may be further included. Furthermore, the device 100 for providing a secure mode, according to an embodiment, may be a mobile terminal itself or may be a single module included in a mobile terminal, such as a mobile phone, a smart phone, and a tablet PC.

Referring to FIG. 4, the device 100 for providing a secure mode, according to an embodiment, may include a security manager 110 and a control unit 130. The security manager 110 according to an embodiment may obtain a plurality of parameters for determining an environment surrounding the device 100 from components included in the device 100 and determine whether the device 100 is in an insecure environment based on the generated plurality of parameters.

For example, the security manager 110 may further include a security score generator for generating a security score by combining the plurality of parameters and may determine that the device 100 is in an insecure environment when the security score exceeds a threshold value. Furthermore, the device 100 may further include a microphone, and the security manager 110 may analyze an audio signal captured via the microphone and obtain one or more parameters indicating an insecure environment.

Furthermore, when it is determined that the device 100 is in an insecure environment, the control unit 130 according to an embodiment may control the device 100 to operate in a secure mode.

Here, the secure mode may include a secure input mode or a secure output mode.

Therefore, the device 100 may further include an input unit for transmitting a user input to an application after applying a decoding algorithm to the user input when a secure input mode is provided.

The device 100 may further include a display unit and a camera. When the secure output mode is provided, the control unit 130 may control the display unit to make the remaining region of the content to be displayed on the display unit other than a region viewed by a user invisible.

Furthermore, the device 100 may further include a vibration generating unit that generates a notification for notifying only a user that the device 100 is operating in a secure mode.

Hereinafter, a method of providing, by the device 100, a secure mode will be described in detail with reference to FIGS. 5 through 8.

Figure 5:
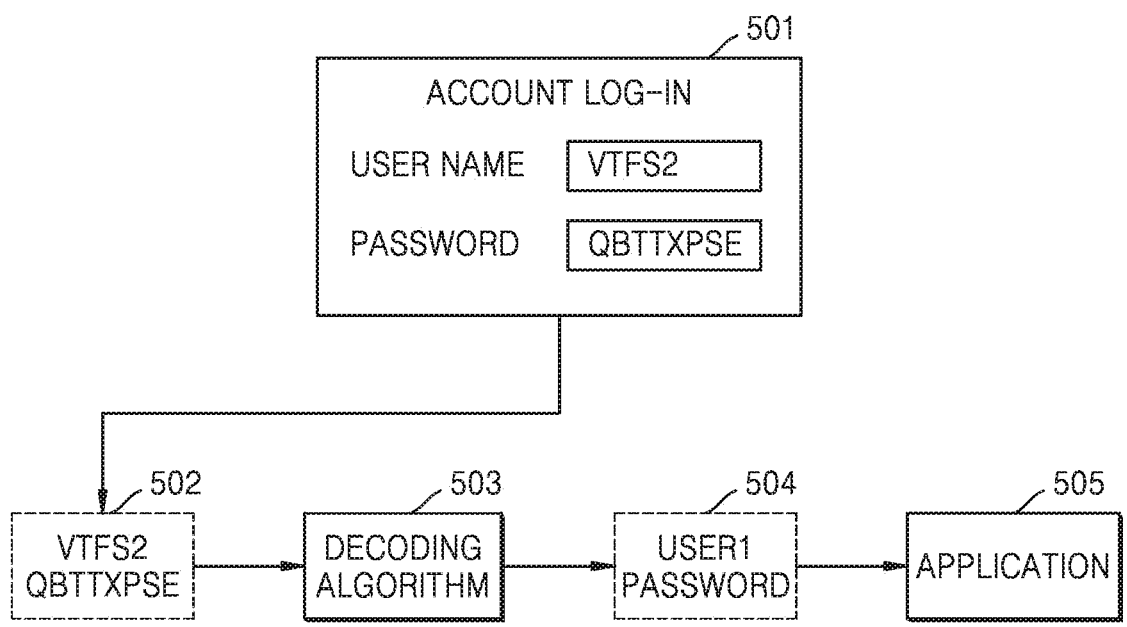
FIG. 5 is a schematic diagram showing a secure input mode of a user device according to an embodiment.

FIG. 5 is a schematic diagram showing a secure input mode of a user device according to an embodiment. A secure input mode of the device 100 may be activated automatically when an insecure environment is detected or when the secure input mode is activated in response to a user command. For example, the device 100 may be configured to be switched from a normal user input mode to a secure user input mode when a user maintains a button press for a predetermined period of time.

In the secure input mode, a user input 502 is received via a user interface screen 501 displayed on a display unit. Next, the user input 502 is processed by a decoding algorithm 503. According to an embodiment, while the device is operating in the secure input mode, the decoding algorithm 503 may be applied to all user inputs or only to one or more predefined types of input information. For example, the decoding algorithm 503 may be applied to sensitive user data, such as account user names and passwords, but may not be applied to web site addresses entered to an Internet browser.

According to the present embodiment, the decoding algorithm 503 decodes the user input 502 by substituting each character of the user input 502 with the preceding character in the alphabet, such that an input text string "VTFS2" may be decoded into an output character string "USER1", wherein an input text string "QBTTXPSE" is decoded to an output text string "PASSWORD". A decoded user input 504 is transferred to an application 505.

According to an embodiment, the decoding algorithm 503 may be pre-programmed in a user device or may be defined by a user. For example, a user may configure a decoding algorithm in advance while in a safe place. According to some embodiments, a security manager of a user device is configured to allow a user to configure a decoding algorithm only when it is determined that the user device is in a secure environment.

Furthermore, according to some embodiments, a user device may be configured to allow a user to modify or generate a decoding algorithm only when the user device is executed in a secure mode to prevent the decoding algorithm from being copied by malware installed on the user device. According to such an embodiment, the user device must be switched to a secure mode before a decoding algorithm is configured. The secure mode may be implemented in various ways. For example, according to some embodiments, when the device 100 is operating in the secure mode, trusted applications may be executed in a trusted execution environment (TEE). Such a trusted application may be used to display a secure user interface for receiving a user input selecting a decoding algorithm. Since a trusted application runs in a TEE, the trusted application may be isolated from malicious software. According to another embodiment, an application for configuring a decoding algorithm may be containerized to use application level container techniques that provide isolation from malicious software to some extent. According to another embodiment, a decoding algorithm may be configured by using an external device (e.g., a laptop computer capable of executing an application for configuring a decoding algorithm in a TEE in an external device). For example, in an external device, a TEE may be a secure digital (SD) smart card or may include other components, such as an embedded secure element (eSE). Preferably, in order to avoid a function for configuring a decoding algorithm being a weakness of a system and to prevent attackers from bypassing a secure mode by exploiting a weakness of the secure mode, the secure mode may include a secure input mode of a level equivalent to or higher than that of a secure input mode provided by the secure mode.

Meanwhile, the decoding algorithm may be configured in various ways. For example, according to some embodiments, a parameter-based method may be used by a user to select one or more parameters that control a method of operating the decoding algorithm. In a character-shift algorithm, in which a user input is decoded by shifting each character to a location a fixed number of characters away from the corresponding character in the alphabet, a user-configurable parameter may be the number of characters that each character should be shifted by to decode the user input. In another example, an algorithm-selection method may be used as a user selects one of a plurality of pre-configured decoding algorithms. In another example, an algorithm-defining method may be used as a user defines an arbitrary decoding algorithm.

The device 100 according to an embodiment may display a user-defined decoding algorithm or a predetermined decoding algorithm. For example, when an algorithm for shifting one character is applied, the device 100 may display a phrase "one character shift". According to an embodiment, it may be determined whether to display a decoding algorithm based on a user input. A user may input a text without an error based on a displayed text. In this case, even when a touch input for inputting a password is leaked, password leakage may be prevented when information regarding a displayed phrase is not leaked.

According to the present embodiment, a decoding algorithm replaces each character in a user input with a preceding character in the alphabet. However, this is merely an example of the decoding algorithm. Therefore, according to other embodiments of the present invention, the following decoding algorithm examples may be used, but the present invention is not necessarily limited thereto:

a) Use the following characters: a user input is decoded by substituting each character with a next character in the alphabet. For example, a user input including "a, d, i, and s" will be decoded to "b, e, j, and t".

b) Take all N-multiple$^{th}$ characters: a user input is decoded by taking all N-multiple$^{th}$ characters of the user input and discarding other characters. For example, when N is 2, a user input of "a, b, c, d, e, f, g, and h" will be decoded to "b, d, f, and h".

c) Discard all N-multiple$^{th}$ characters: a user input is decoded by discarding all N-multiple$^{th}$ characters of the user input and keeping the other characters. For example, when N is 2, a user input of "a, b, c, d, e, f, g, and h" will be decoded to "a, c, e, and g", p By transferring a user input through a decoding algorithm before transferring the user input to an application, the device 100 may input a user input in an obfuscated manner. Since decoded user inputs (a real name USER1 and a password PASSWORD according to the present embodiment) are not displayed, and thus the decoded user input may not be intercepted. Furthermore, a third party is unable to reconstruct a decoded user input without information regarding a decoding algorithm. Therefore, a third party who attempts to surreptitiously obtain personal information by using a malicious key logging program installed on the device 100 will receive only an encoded user input as it is input, and thus the third party will not be able to restore a decoded user input. Furthermore, according to some embodiments of the invention, a decryption algorithm may apply a code obfuscation technique to protect a user input from being reverse engineered. A specific code obfuscation technique may be changed by periodic software upgrades of a decoding algorithm for providing additional security.

Every time a code obfuscation method is changed, a decoding algorithm may also be updated. As a result, additional security may be provided even when a previous decoding algorithm with a previous code obfuscation technique has been compromised. Furthermore, according to some embodiments, a decoding algorithm may be changed automatically every time a password is successfully entered by a user. Therefore, a replay attack that an attacker re-enters by using a previously observed encoded password without knowledge of the decoding algorithm may be prevented.

Figure 6:
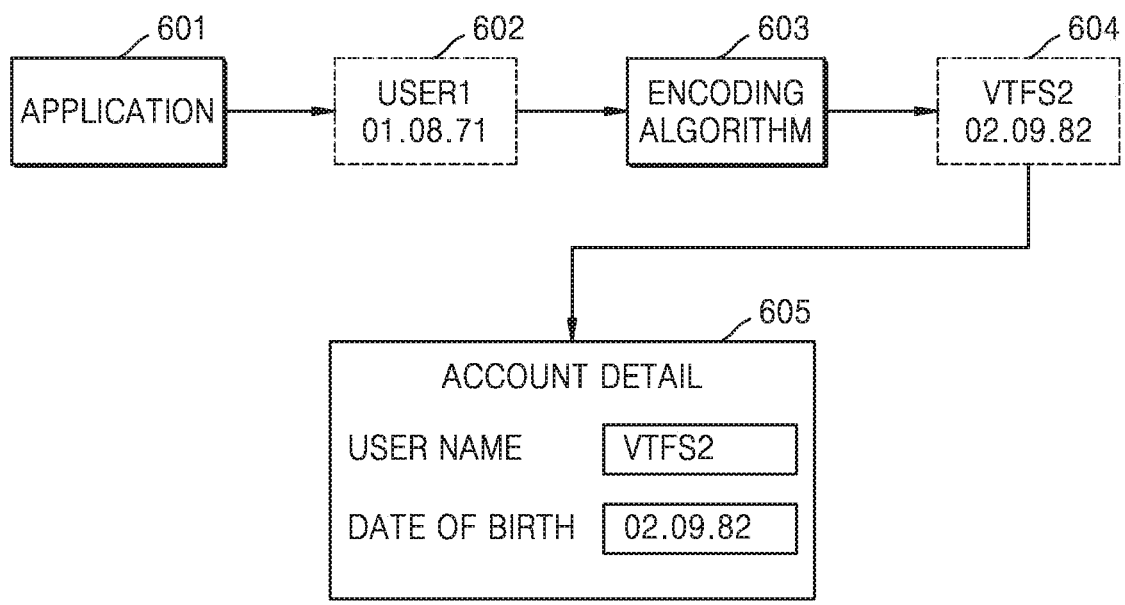
FIG. 6 is a block diagram of a secure output mode of a user device according to an embodiment.

According to some embodiments of the present invention, a secure input mode may be used with a secure output mode. An example of a secure output mode in a user device according to an embodiment of the present invention is schematically shown in FIG. 6.

In a secure input mode, the device 100 obtains data 602 to be displayed. According to the present embodiment, the data 602 is generated by an application 601 executed on the device 100. However, according to another embodiment, the data 602 could be obtained in a different manner. For example, the data 602 may be received from a server. According to the present embodiment, the data 602 may undergo processing via an encoding algorithm 603 to which an encoding method opposite to that used by the decoding algorithm 503 is applied before the data 602 is displayed on the device 100. However, according to another embodiment, an encoding algorithm 603 may use an encoding method completely separated from a decoding algorithm 503 used in a secure input mode. The encoding algorithm 603 may be used by a content renderer that encodes the data 602 before being displayed. The encoding algorithm 603 may output encoded data 604, and the encoded data 604 may be displayed on a display screen 205. According to the present embodiment, the encoded data 604 including a user name "USER1" and a date of birth "01.08.71" is displayed.

The encoding algorithm 603 encodes data by replacing each character of the data 602 with the next character of the alphabet or the next higher integer. Therefore, am input text string "USER1" is encoded into an output text string "VTFS2", and an input text string "01.08.71" is encoded into an output text string "02.09.82". Since the encoding algorithm is known to the owner of the user device, the user and the device are capable of correctly interpreting the displayed encoded data. At the same time, the data 602 may be prevented from being accessed through an interception without information regarding the encoding algorithm 603.

Figure 7:
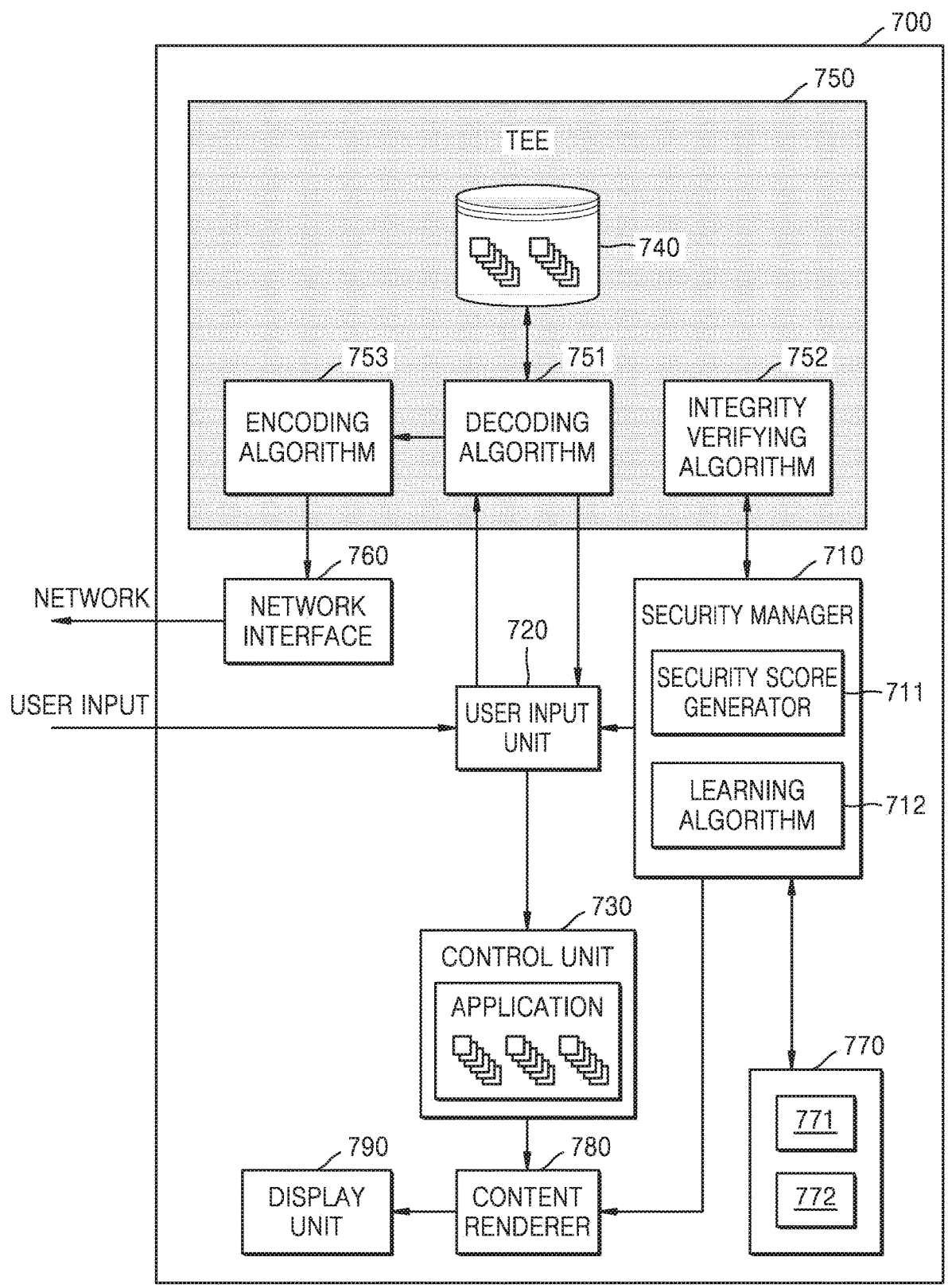
FIG. 7 is a schematic diagram showing a user device configured to provide a secure input and a secure output, according to an embodiment of the present invention.

FIG. 7 is a schematic diagram showing a user device configured to provide a secure input and a secure output, according to an embodiment of the present invention. The particular elements shown in FIG. 7 may be implemented in software, hardware, or a combination thereof, according to particular embodiments. A device 700 shown in FIG. 7 may be implemented as various types of user devices. The device 700 includes, but is not necessarily limited to, a smart phone, a tablet computer, and a desktop or laptop computer. The various components of the device 700 shown in FIG. 7 may be included within a same physical device or may be distributed among a plurality of devices configured to communicate with one another.

As shown in FIG. 7, the device 700 includes a security manager 710 and a user input unit 720 configured to enable the secure user input mode described above with reference to FIG. 5. The security manager 710 is configured to determine whether the user device 700 is in an insecure environment. According to the present embodiment, the security manager 710 includes a security score generator 711 that receives a plurality of input parameters related to the security of an environment in which the user device is currently located and calculates a security score based on the plurality of input parameters. The security manager 710 is configured to compare a threshold score to a security score to determine whether the user device 700 is in an insecure environment. For example, a high security score may represent a relatively secure environment, whereas a low security score may represent a relatively insecure environment. A threshold value for determining whether a device is in an insecure environment may be fixed or may be configured by a user. The security manager 710 controls the user input unit 720 to operate in a secure user input mode in response to a determination that the device 700 is in an insecure environment.

The device 700 may include one or more input/output devices 770 that allow the security manager 710 to communicate. The device 700 includes a plurality of input/output devices 770 including a microphone 771 configured to capture an audio signal of an environment in which the user device is currently located and a vibrating mechanism 772.

According to the present embodiment, the security manager 710 is configured to control the vibrating mechanism 772 that generates a vibration alert when an input unit is switched to a secure user input mode. The vibration alert may include a single vibration pulse or a code pulse to alert a user that a secure user input mode is being used. Since it is difficult for other people to notice a vibration of the device 700, it may discreetly alert activation of a secure input mode to a user without alerting change of an input mode to other people nearby. However, according to another embodiment, encoded audio and/or visual signals may be output as other ways of notifying a user, for example. Using such a discreet alerting method, other people may be prevented from recognizing activation of a secure input mode or a sensitive application, thereby providing an additional security layer.

As described above, the security manager 710 is configured to determine whether the device is currently in a secure environment or an insecure environment based on a security score generated by the security score generator 711. An audio signal collected by the microphone 771 may be used as one of input parameters for generating a security score. For example, when the background noise level of an audio signal is low, a high security score may be generated. When the background noise level of an audio signal is high, a low security score may be generated, because it represents a crowded environment in which private information is highly likely to be viewed by peepers. According to some embodiments, the security manager 710 may perform more complex analysis of an audio signal. For example, an approximate value of the number of persons nearby the user device 700 may be determined by detecting human voices in an audio signal.

As an alternative for generating a security score based on a plurality of inputs, the security manager 710 according to some embodiments may detect an insecure environment based on only one input. For example, the security manager 710 may analyze an audio signal captured by the microphone 771 to detect one or more audio characteristics indicating an insecure environment (e.g., background noise detected from the audio signal or the number of human voices), thereby determining whether the user device is in an insecure environment. Furthermore, according to some embodiments, both of the techniques described above may be used. For example, when only one input is available, the security manager 710 may be configured to make a decision based on one possible input. However, when multiple inputs become available, the security score generator 711 may be used to convert the multiple inputs to a security score.

By converting a plurality of inputs to a security score, the probability of false detection of an insecure environment (hereinafter referred to as "false positive") may be reduced. When only one parameter is taken into account, a false positive result indicating an insecure environment may sometimes be derived, even when the device 700 is actually in a secure environment. For example, a home environment may be relatively safe, but an audio signal recorded in the home environment may sometimes have a high background noise level due to the use of appliances. In other words, when a simple determination is made based on a background noise level, the security manager 710 may determine that a current environment is an insecure environment even when no interception exists. Therefore, it is desirable to make detection of an insecure environment more reliable by using the security score generator 711. An additional benefit of considering multiple inputs when determining whether a current environment is a secure environment is that it becomes more difficult for an attacker to manipulate a security manager to make a wrong decision that the security manager is in a secure environment. The reason thereof is that the attacker must control/manipulate many parameters input to the security score generator. However, according to some embodiments, a simple decision algorithm based on only one input may be used in consideration of resource limits (e.g., battery charge level, available processing capabilities, etc.) to the user device 700, and a security score generator 711 may be omitted.

Continuing to refer to FIG. 7, the device further includes a control unit 730 configured to execute an application. When the device is operating in a secure user input mode, the user input unit 720 is configured to receive a user input, decode the received user input by using a decoding algorithm 751, and transfers the decoded user input to an application do. According to the present embodiment, the device 700 further includes a memory 740 configured to store a user-defined decoding algorithm. However, according to an embodiment of the present invention, a pre-programmed decoding algorithm may also be used in place of or in addition to a user-defined decoding algorithm. Furthermore, according to some embodiments, the user input unit 720 may be configured to periodically select a next decoding algorithm from a plurality of decoding algorithms according to a predetermined sequence and to change the decoding algorithm 751. Furthermore, the device 700 may be configured to notify a user when a decoding algorithm 751 has changed. The notification may vary depending on a decoding algorithm 751 selected to represent a current decoding algorithm among a plurality of decoding algorithms. For example, when there are three possible decoding algorithms, the decoding algorithms used in the user input unit 720 may be configured to be cycled in order. Every time the decoding algorithm is changed, the vibrating mechanism 772 may be controlled to generate a number of vibration pulses corresponding to the order of the decoding algorithm sequence. In other words, one pulse may be generated for the first decoding algorithm of a sequence, two pulses may be generated for the second decoding algorithm, and three pulses may be generated for the third decoding algorithm.

In particular, when a specific time point at which one decoding algorithm is switched to a next decoding algorithm is not recognized by the one decoding algorithm, regularly changing a decoding algorithm in this manner may make a person attempting interception difficult to estimate a decoding algorithm by observing user inputs.

In this way, the application may continue normal operation in a secure user input mode without any modification and without any information regarding whether a security user input is being made. Furthermore, according to some embodiments of the invention, a plurality of applications may be executed by the control unit 730, and the user input unit 720 may be configured to use different decoding algorithms respectively associated with the applications. When a user input is received via one of the applications, the user input unit 720 may determine an application indicated by the user input and may decode the user input by using a decoding algorithm associated with the particular application.

In some cases, a received user input may be transmitted over a network and delivered to an application being executed on the user device 700 instead of or in addition to the network transmission. According to the present embodiment, the device 700 may further include a network interface 760 for communicating with other devices via a network. When the user input unit 720 is operating in a secure user input mode and a decoded user input is transmitted over a network, the decoded user input may be selectively encoded before being transmitted via the network interface 760 for additional security. According to the present embodiment, the device 700 may further include an encoding algorithm 753 for encoding a user input decoded by using the decoding algorithm 751 before transmitting the encoded user input over a network.

Furthermore, the device 700 according to the present embodiment may further include a trusted execution environment (TEE) 750. In an external device, the TEE may include other components, such as a secure digital (SD) smart card and/or an embedded secure element (eSE). Both the decoding algorithm 751 and the encoding algorithm 753 may be executed in the TEE 750. Furthermore, the TEE 750 according to an embodiment of the present invention may include the memory 740 configured to store a user-defined decoding algorithm. According to another embodiment, a user-defined decoding algorithm may be stored in a memory outside the TEE 750. Execution of the decoding algorithm 751 and the encoding algorithm 753 in a trusted execution environment may prevent any malicious software that may be executed on the device 700 from accessing the decoding algorithm 751 or the encoding algorithm 753. However, according to another embodiment, either or both a decoding algorithm and an encoding algorithm may be executed outside a TEE, and a TEE may even be omitted.

According to some embodiments, when a user device includes the TEE 750, the security manager 710 may be executed in the TEE 750. However, processing resources available within the TEE 750 may be limited. Therefore, the security manager 710 according to some embodiments may be executed outside the TEE 750, and the device 700 may be configured to perform an integrity verifying algorithm 752 for verifying the integrity of the security manager 710 within the TEE 750. The integrity verifying algorithm 752 may be used to determine whether the security manager 710 operating outside the TEE 750 is compromised. For example, the integrity verifying algorithm 752 may generate a hash in a processing space in a memory of the security manager 710 and execute a verification algorithm regarding the generated hash. The integrity verifying algorithm is configured to output a warning when verification fails. Computer program codes regarding the integrity verifying algorithm 752 may be significantly smaller than computer program codes for the security manager 710. Therefore, such an approach enables efficient use of available resources of the TEE 750 while providing a security technique for verifying whether a security manager is compromised.

According to the present embodiment, the security manager 710 is configured not only to be automatically switched to a security user input mode, but also to be switched to a security user input mode by a user. The security manager 710 includes a learning algorithm 712 configured to learn conditions that a user prefers to switch a user input unit to a secure user input mode. For example, the learning algorithm may learn that a user primarily selects a secure user input mode when a device is at a specific location determined based on GPS coordinates or wireless communication identifiers. The security manager 710 may be configured to quickly switch the user input unit 720 to a secure user input mode in response to a condition occurrence or to automatically switch the user input unit 720 to a secure user input mode without requesting for a user approval. The use of the learning algorithm is convenient for a user. The reason thereof is that, since the device 700 may anticipate when a user desires to switch to a security user input mode and may remind the user to select the secure input mode when the user forgets to do so in a case where the user normally selects the secure input mode.

The device 700 may further include a content renderer 780 configured to render content to be displayed on a display unit 790 that is integrated with the user device 700 or physically separated therefrom. The content renderer 780 is configured to transmit rendered content to the display unit 790. According to the present embodiment, as described above with reference to FIG. 2, when it is determined that the device 700 is in an insecure environment, the security manager 710 is configured to control the content renderer 780 to operate in a secure output mode for encoding and displaying the content by using an encoding algorithm 753 before the content is rendered and displayed. According to another embodiment, instead of using a decoding algorithm 751 or in addition to the decoding algorithm 751, another secure output mode, such as a spotlight-based display method, may be used. Furthermore, according to some embodiments, a secure output mode may be omitted or may be triggered in response to a criterion different from that of a secure user input mode.

Figure 8:
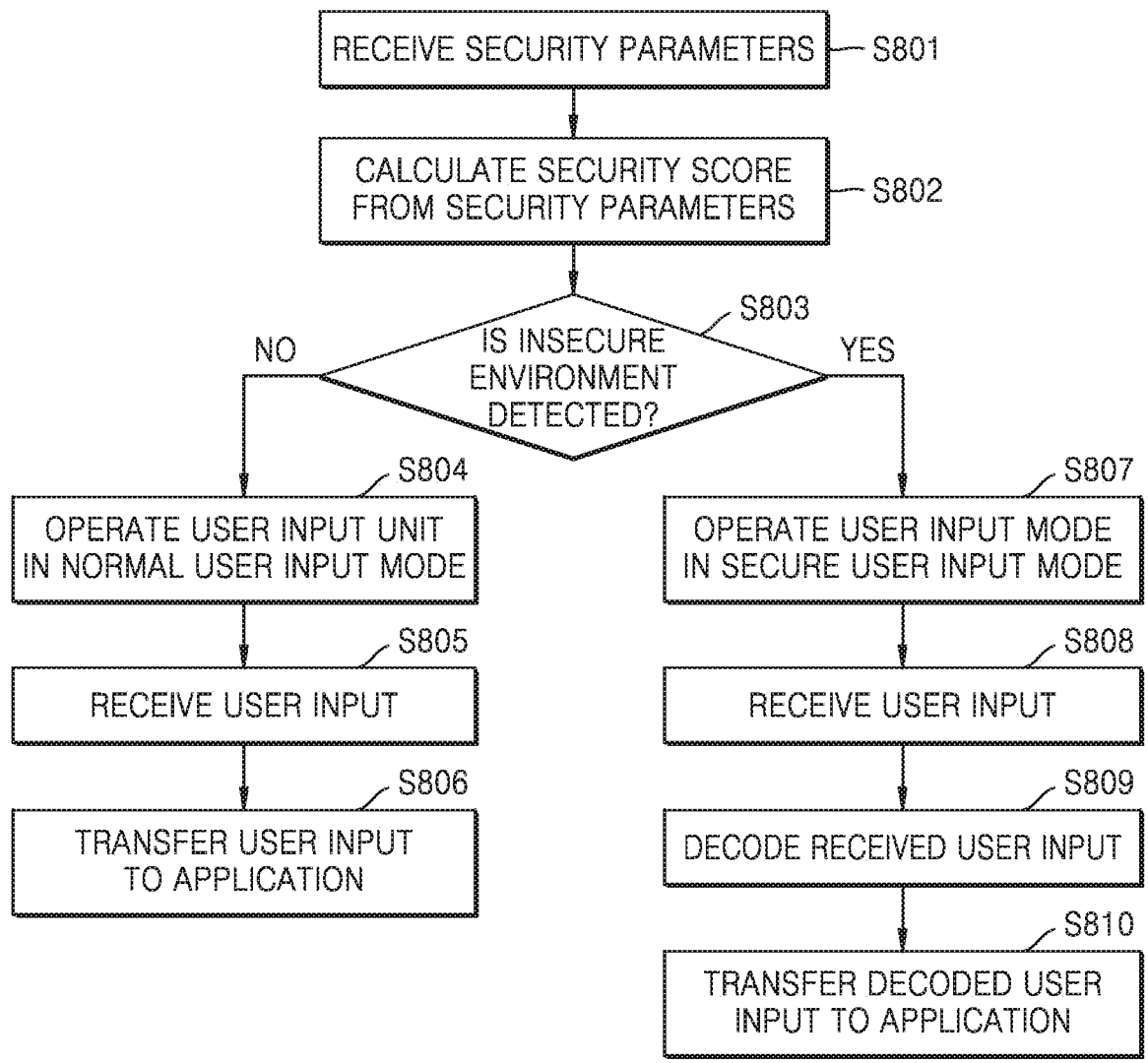
FIG. 8 is a block diagram of a user device configured to provide secure input/output modes.

FIG. 8 is a flowchart of a method of enabling a secure input to a user device according to an embodiment of the present invention. The method may be performed to determine whether a user device is to operate in a normal input mode or a secure mode. The method may be implemented by computer program instructions configured to perform the method by a control unit of a user device.

First, in operation S801, a security manager of a user device receives one or more security parameters. The security parameters may include output(s) from one or more sensors included in the device or may include information received from a user or information received from another source (e.g., a server).

According to the present embodiment, in operation S802, the security parameters are used as an input of a security score generator that converts security parameters into a security score. Examples of types of information that may be included in the security parameters according to an embodiment of the present invention are given below, but are not limited thereto.

a) Location parameters: For example, a device may be configured to determine a current location of the device via a global navigation satellite system (GNSS) receiver and/or based on a wireless (WiFi) signal for identifying a short-range wireless communication network. According to some embodiments, triangulation may be used to calculate a more accurate location from a plurality of WiFi signals. The device may obtain location parameters input to the security score generator by determining a current location of a database. Here, the database may be locally stored in the device or accessed through a server, wherein a location parameter indicating whether a current location is in a secure environment or an insecure environment may be searched for in the database.

b) Noise parameters: The device may be configured to receive an audio signal via a microphone configured to record ambient noises in an environment surrounding the device. An audio signal may be directly input to a security score generator, or parameters derived from an audio signal may be used as a noise score input to the security score generator. Examples of (but not necessarily limited to) parameters that may be derived from an audio signal: average ambient noise level; presence/absence of human voice; the number of different tones included in detected audio signal; and the size of a room estimated based on echo detected from the audio signal. For example, a high ambient noise level or frequent detection of personal voices may indicate that a user is in an unsafe environment.

c) Visual Information: The device may be configured to capture an image or video via a camera (e.g., a front camera or a rear camera included in the user device). The security score generator may be configured to analyze a captured image to detect the face of a person in the vicinity of the user device to determine whether there are potentially interceptors. When a face other than the face of a user of the device is detected, the security score generator may be configured to output a security score for switching the device to a secure input mode. According to some embodiments, when a face is detected in a still image or a video image captured by the user device, face recognition software may be used to compare a database of authorized users with the detected face. Here, the database of the authorized users is a database for determining whether a user is authorized to view sensitive user information of the device. When the detected face does not match those of authorized users, the secure input mode is activated.

d) Geo fencing parameters: The device may be configured to receive a signal from the geo-fencing system that indicates a case where the device is moved out of the boundary of a defined security area. The security score generator may be configured, such that the device is switched to secure input mode, in response to geo-fencing parameters indicating that the device is outside a secure area.

e) Application parameters: An application that may be executed by the device may be flagged as a 'secure' application. A 'secure' application is an application that requests a user to input sensitive information. Application parameters input to the security score generator depend on whether an application currently being executed on the user device is a 'secure' application. When one or more 'secure' applications are being executed, a secure user input mode may be activated.

The various security parameters may take different forms, according to embodiment. For example, a security parameter may be a Boolean flag set to indicate that 'TRUE' means a secure environment and 'FALSE' means an insecure environment. Alternatively, a security parameter may have arbitrary level values associated with different levels of risk. For example, the location parameters described above may have an integer value from 0 to 4, where 0 may indicate a trusted location, 1 may indicate a low risk location, 2 may indicate an intermediate risk location, 3 may indicate a high risk location, and 4 may indicate a very high risk position.

The security score generator may generate an output security score by combining input security parameters. An output security score may be a simple flag that is configured to indicate security/insecure environment by TRUE/FALSE, may have different values indicating different levels of risk in a manner similar to that described above, or may continue to change. For example, according to some embodiments, the security score generator may simply sum input parameters. According to another embodiment, a weight may be applied to each security parameters to generate a weighted sum. According to another embodiment, a security pseudo-based process may be followed to generate a security score.

For example, when the number of security parameters with values indicating a high risk environment is identical to a specific number, a security score indicating an insecure environment may be generated.

In operation S803, the security score is compared with a threshold value to determine whether a current environment is secure or insecure. When a high security score indicates a secure environment and, for example, when the security score is lower than the threshold value, the current environment is determined as an insecure environment. As described above, the threshold value may be defined by a user or may be pre-programmed. According to some embodiments, the threshold value may be set by an administrator of the user device, or different threshold values may be set for different applications, respectively. Some applications may be allowed to change a default threshold value appropriately.

In operation S804, the user device is controlled to operate in a normal user input mode, in response to the determination at operation S803 that the current environment is a secure environment. In the normal input mode, when a user input is received in operation S805, the user input is directly transferred to an application in operation S806. On the other hand, when it is determined in operation S803 that the current environment is an insecure→내 environment, the device is controlled to operate in a secure user input mode in operation S807. As described above, according to the present embodiment, a decoding algorithm is applied to a user input in the secure user input mode. When a user input is received in operation S808, the user input is decoded in operation S809 by using the decoding algorithm, and the decoded user input is delivered to a corresponding application in operation S810.

While specific embodiments of the invention have been described herein with reference to the drawings, various changes and modifications may be made therein without departing from the scope of the invention as defined in the appended claims.

One embodiment may also be implemented in the form of a recording medium including instructions executable by a computer, such as program modules, being executed by a computer. Computer readable media can be any available media that can be accessed by a computer and includes both volatile and nonvolatile media, removable and non-removable media. The computer-readable medium may also include both computer storage media and communication media. Computer storage media includes both volatile and nonvolatile, removable and non-removable media implemented in any method or technology for storage of information such as computer readable instructions, data structures, program modules or other data. Communication media typically includes any information delivery media, including computer readable instructions, data structures, program modules, or other data in a modulated data signal such as a carrier wave, or other transport mechanism.

While the present invention has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the exemplary embodiments described above are not limiting the scope of the present invention. For example, each component described in a single type may be executed in a distributed manner, and components described distributed may also be executed in an integrated form.

The scope of the present invention is defined by the appended claims rather than the detailed description, and all changes or modifications derived from the meaning and scope of the claims and their equivalents are included in the scope of the present invention.

The invention claimed is:

1. A method of providing a secure mode of an apparatus, the method comprising:
   obtaining a plurality of parameters for identifying a security environment from one or more apparatuses included in the apparatus;
   identifying whether the apparatus is in an insecure environment based on combinations of the plurality of parameters;
   based on the apparatus being in the insecure environment, controlling the apparatus to operate in the secure mode;
   based on the apparatus being in the secure mode, obtaining a first user input in a trusted execution environment (TEE);
   applying a first decoding algorithm to the first user input while in the TEE; and based on the apparatus being in a secure input mode and based on a second user input being obtained, applying a second decoding algorithm to the second user input,
   wherein the first decoding algorithm includes at least one of replacing each character of the first user input with another character, keeping all nth characters and discarding the other characters of the first user input, or discarding all nth characters of the first user input.

2. The method of claim 1, wherein the identifying of whether the apparatus is in the insecure environment further comprises:
   generating a security score indicating a level of security by combining the plurality of parameters; and
   identifying that the apparatus is in the insecure environment based on the security score exceeding a threshold value.

3. The method of claim 1, wherein the obtaining of the plurality of parameters comprises:
   obtaining an audio signal captured by a microphone of the apparatus.

4. The method of claim 3, wherein the identifying of whether the apparatus is in the insecure environment comprises:
   comparing the audio signal with a noise level threshold.

5. The method of claim 1, wherein the apparatus is identified to be in the insecure environment based on the apparatus being identified to be in a public place.

6. The method of claim 1, further comprising:
   transmitting the first user input to an application, after the first decoding algorithm is applied to the first user input.

7. The method of claim 1, further comprising:
   in a secure output mode associated with the secure mode, controlling a display to output only a region being viewed by a user and obfuscate other regions on the display not being viewed by the user based on tracking at least one eye of the user using a camera of the apparatus.

8. The method of claim 1, further comprising:
   generating a notification to notify only a user that the apparatus is operating in the secure mode.

9. The method of claim 1, wherein the TEE includes a memory which stores the first decoding algorithm.

10. The method of claim 1, further comprising:
based on the decoding of the first user input, controlling a vibrating mechanism of the apparatus to generate a first number of vibration pulses corresponding to the first decoding algorithm; and
based on the decoding of the second user input, controlling the vibrating mechanism to generate a second number of vibration pulses corresponding to the second decoding algorithm.

11. An apparatus that provides a secure mode, the apparatus comprising:
at least one processor configured to:
obtain a plurality of parameters for identifying a security environment from one or more apparatuses included in the apparatus,
identify whether the apparatus is in an insecure environment based on combinations of the plurality of parameters,
control the apparatus to operate in the secure mode, based on the apparatus being in the insecure environment,
based on the apparatus being in the secure mode, obtain a first user input in a trusted execution environment (TEE),
apply a first decoding algorithm to the first user input while in the TEE, and
based on the apparatus being in a secure input mode and based on a second user input being obtained, apply a second decoding algorithm to the second user input,
wherein the first decoding algorithm includes at least one of replacing each character of the first user input with another character, keeping all nth characters and discarding the other characters of the first user input, or discarding all nth characters of the first user input.

12. The apparatus of claim 11, wherein the at least one processor is further configured to:
generate a security score indicating a level of security by combining the plurality of parameters, and
based on the security score exceeding a threshold value, identify that the apparatus is in the insecure environment.

13. The apparatus of claim 11, further comprising:
a microphone,
wherein the at least one processor is further configured to:
analyze an audio signal captured by the microphone, and
identify that the apparatus is in the insecure environment based on the analyzing of the audio signal.

14. The apparatus of claim 13, wherein the identification that the apparatus is in the insecure environment is based on a comparison of the audio signal with a noise level threshold.

15. The apparatus of claim 11, wherein, based on the apparatus being identified to be in a public place, the at least one processor is further configured to identify that the apparatus is in the insecure environment.

16. The apparatus of claim 11, wherein, while in the secure input mode associated with the secure mode, the at least one processor is further configured to control transmission of the first user input to an application, after the first decoding algorithm is applied to the first user input.

17. The apparatus of claim 11,
wherein the secure mode comprises a secure output mode, and,
wherein, based on the secure output mode being provided, the at least one processor is further configured to control a display to omit displaying of regions not being viewed by a user and control the display to display a region viewed by the user based on tracking at least one eye of the user using a camera of the apparatus.

18. The apparatus of claim 11, wherein the at least one processor further configured to generate a notification to notify only a user that the apparatus is operating in the secure mode.

19. The apparatus of claim 11, wherein the at least one processor is further configured to:
identify if the at least one processor is compromised or uncompromised based on an integrity verifying algorithm, and
based on the at least one processor being compromised, generate a warning.

20. A non-transitory computer-readable recording medium having recorded thereon a program for executing instructions to cause an apparatus to:
obtaining a plurality of parameters for identifying a security environment from one or more apparatuses included in the apparatus;
identifying whether the apparatus is in an insecure environment based on combinations of the plurality of parameters;
based on the apparatus being in the insecure environment, controlling the apparatus to operate in a secure mode;
based on the apparatus being in the secure mode, obtaining a first user input in a trusted execution environment (TEE);
applying a first decoding algorithm to the first user input while in the TEE; and
based on the apparatus being in a secure input mode and based on a second user input being obtained, applying a second decoding algorithm to the second user input
wherein the first decoding algorithm includes at least one of replacing each character of the first user input with another character, keeping all nth characters and discarding the other characters of the first user input, or discarding all nth characters of the first user input.

21. The non-transitory computer-readable recording medium of claim 20, wherein the identifying of whether the apparatus is in the insecure environment further comprises:
generating a security score indicating a level of security by combining the plurality of parameters; and
identifying that the apparatus is in the insecure environment based on the security score being above or below a threshold value.

22. The non-transitory computer-readable recording medium of claim 20, wherein the obtaining of the plurality of parameters comprises:
obtaining an audio signal captured by a microphone of the apparatus.

23. The non-transitory computer-readable recording medium of claim 20, wherein the apparatus is identified to be in the insecure environment, based on the apparatus being identified to be in a public place.

* * * * *